Dec. 22, 1959 H. O. FROHBACH ET AL 2,918,189

TAPE DISPENSER

Filed July 8, 1957 2 Sheets-Sheet 1

Dec. 22, 1959 H. O. FROHBACH ET AL 2,918,189

TAPE DISPENSER

Filed July 8, 1957 2 Sheets-Sheet 2

United States Patent Office 2,918,189

Patented Dec. 22, 1959

2,918,189

TAPE DISPENSER

Harold O. Frohbach, Leeds, Mass., Earle F. Gill, Barrington, Ill., John S. Marran, Leeds, Mass., and Anthony J. Romano, Farmingdale, N.Y., assignors to Chart-Pak, Incorporated, Leeds, Mass., a corporation of Connecticut Application July 8, 1957, Serial No. 670,467

3 Claims. (Cl. 216—20)

This invention relates to a device for holding and applying tape having one side thereof tacky so as to provide an adhesive surface without the use of any liquid or any other medium, whereby the tape may be caused to adhere to any surface by applying it thereto and pressing down. Such tape is known commercially as "pressure sensitive tape."

This invention has particular reference to very narrow tapes, for instance pressure sensitive tapes of 1/32 or 1/16 inch width, which when imprinted with symbols, graphic representations, color, etc., are used for producing statistical charts and tables, engineering graphs, layout of offices or factories, and for many other visual aids. By the use of these tapes valuable drafting time is conserved and relatively inexperienced personnel is capable of producing charts of highest quality which are ready for reproduction and duplication by the various printing processes.

In connection with this work it is necessary to dispense tape easily and accurately in a straight or curved line or through pre-plotted points on a graph. Heretofore most dispensers for this use have not been entirely successful in view of the fact that the comparatively narrow tape had to be handled by the operator's fingers and the operator's fingers became wrapped by the tape itself so that tape was lost in getting it initially affixed to the surface before stringing it out thereover. Still further, the tape could not be applied accurately to the graph without a great amount of skill and diligence.

Quite obviously tapes of 1/32 to 1/16 inch width are very difficult to handle without causing twisting, bending, wrinkling, creasing and other deformations to the tape prior to or during application of the tape. Such defects are particularly obvious and unwanted when designing straight and uniform lines. Unless the tape dispenser dispenses and applies tape directly from the roll without intermediate manual handling and in such a manner that the dispenser almost completely excludes the possibility of accidental tilting during use, the above defects can hardly be avoided.

One of the objects of this invention therefore is to provide a tape dispenser which avoids one or more of the disadvantages of prior art devices.

Another object of this invention is the provision of a tape dispenser particularly suited for dispensing narrow pressure sensitive tapes.

Another object of this invention is the provision of a tape dispenser which dispenses pressure sensitive tape directly to the surface to which the tape is being affixed.

A further object of this invention is the provision of a tape dispenser which is operated manually and which will, when operated properly, affix tape to a flat surface in a straight line and in a uniform manner.

A further object of this invention is the provision of a tape dispenser which is equipped with guide means to assure that the tape is being affixed to a surface without tilting of the dispenser thereby causing the tape to be in a plane parallel to the plane of the surface to which the tape is being affixed.

Another and further object of the present invention is the provision of a tape dispenser which is equipped with means to reduce the tendency of the tape to adhere to the walls of the tape enclosure.

Another and still further object of this invention is the provision of a tape dispenser for narrow tapes which is constructed to prevent jamming of tape.

Still further and other objects of the invention will become apparent by reference to the following description taken in conjunction with the accompanying drawings in which.

Figures 1, 2, 3:
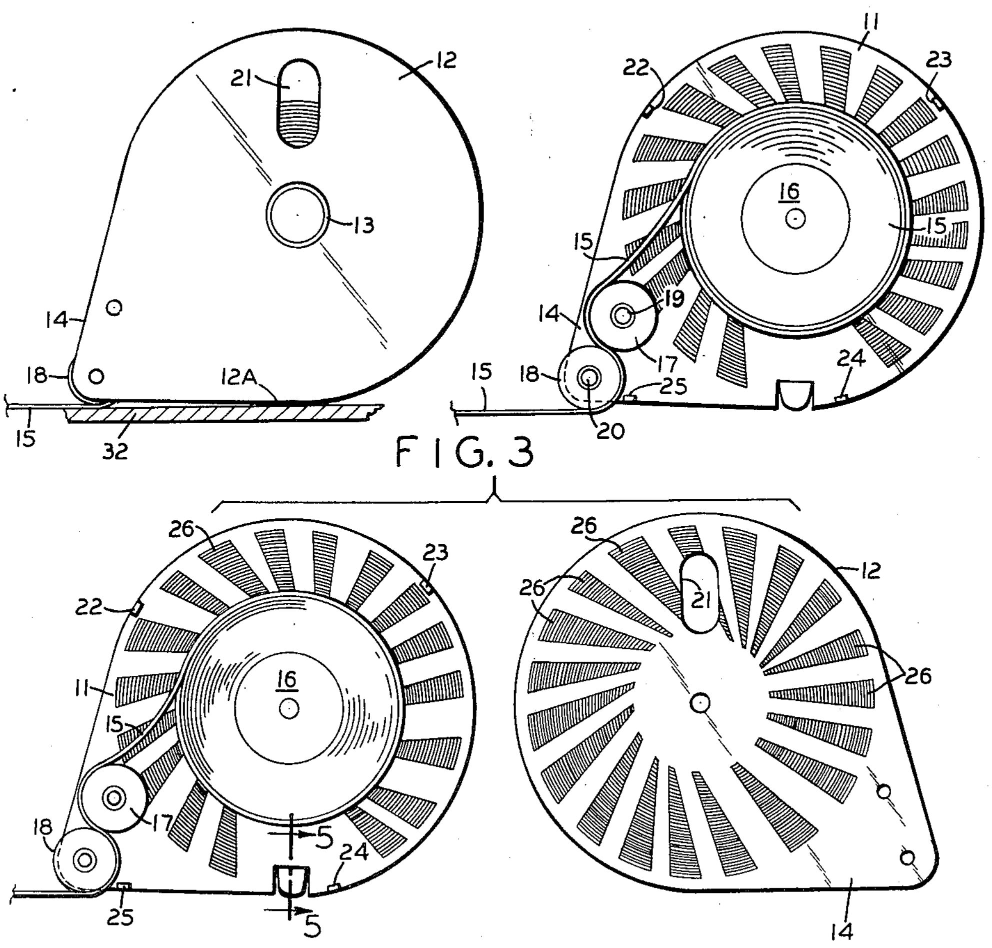
Figure 1 is a side view of the tape dispenser in its assembled form.
Figure 2 is a side view at the inside of the tape dispenser with one cover plate removed.
Figure 3 is a view at the inside of the tape dispenser, both cover plates unfolded.
Figure 5:
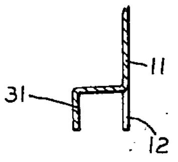
Figure 5 is a cross sectional view of a portion of one cover plate along line 5—5 of Figure 3.
Figure 4:
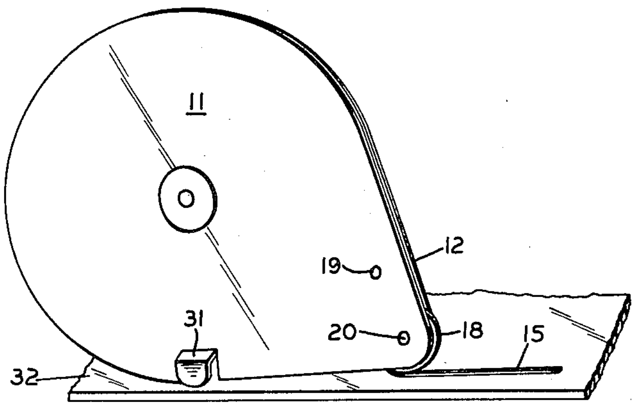
Figure 4 is a side view of the tape dispenser as viewed from the opposite side of the view shown in Figure 1.
Figure 6:
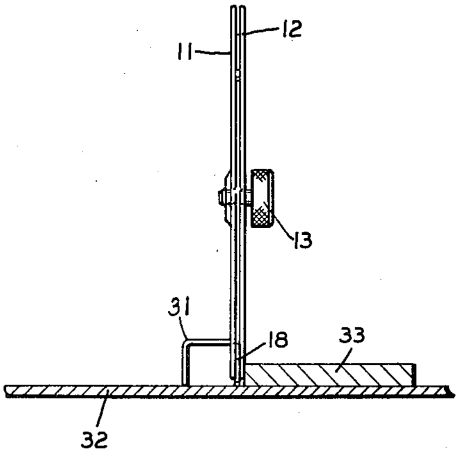
Figure 6 is a front view at the tape dispenser in its assembled stage.

Referring now to the figures, and Figures 1, 4 and 6 in particular, numerals 11 and 12 identify two spaced apart cover plates which are held together by a centrally located screw means 13. The cover plates are generally of circular configuration except for extended portion 14 from which the tape confined within the container is dispensed. The plates may be made from thin metal sheet stock, such as steel, brass or copper, or other suitable material.

A roll of pressure sensitive tape 15 is supported on a circular spindle 16 which protrudes from the inside of cover plate 11 with a thickness substantially equal to the width of the tape 15. The tape from the roll is unwound and dispensed from the dispenser via a set of rollers 17 and 18 which are fastened to plate 11 by means of studs 19 and 20 respectively. Both rollers are mounted in such a manner that they may rotate freely about their respective stud when dispensing tape. Roller 18 serves also as a pressure roller since it is used for pressing the tape 15 against the surface 32 to which the tape is being affixed and to achieve this purpose, roller 18 is located in such a manner that a portion thereof extends beyond the confines of the cover plates. Cover plate 12 furthermore, is equipped with an elongated aperture 21 which serves to check visually the amount of tape remaining within the dispenser. Since the dispenser is designed for dispensing very narrow tape it is important that the plates remain spaced from one another in such a manner that no undue pressure is exerted upon the roll of tape or onto the tape as tape is unwound from the roll. To this end, spindle 16 is dimensioned so that its width protruding from the inside of cover plate 11 is substantially of the same or of slightly greater thickness than the width of the tape. Moreover, a plurality of lugs is provided near the periphery of the plate 11, extruded from the plate, the lugs extending toward cover plate 12 so as to keep the plate 12 spaced parallel to plate 11. Lugs 22, 23 and 24 are designed in such a manner that the extending length in the direction toward other cover plate is substantially equal to the protruding thickness of spindle 16. Another lug, lug 25, is located in close proximity to pressure roller 18 and serves to form with the periphery of the roller 18 a gate to retain tape 15 as the tape is wound about the roller.

To reduce still further, the lateral friction of the tape against the inside of the cover plates and to diminish the possibility of adhesion of the tape to the plates, the inside of cover plates 11 and 12 is provided with a multitude of tiny closely spaced scorings 26 (Figure 3); each scoring just a few thousandths of an inch deep, but the entire scoring arranged in a fan type pattern. It may be noted that all these precautions are of considerable importance considering that the dispenser is designed for dispensing pressure sensitive tape of 1/32 and 1/16 inch width and that tapes of such narrow width are extremely flimsy, fragile and tear readily unless the unwinding pressure is reduced to an absolute minimum.

In making statistical charts it is important that the tape may be readily applied in a straight and forward manner without causing tilting or tipping of the tape dispenser since any such action would cause the narrow tape to become damaged or to fail in its adhesion to the surface to which it is being affixed. In order to assure that the tape when dispensed, contacts the surface to which it is being affixed over the entire tape width, an L-shaped leg 31 is extruded from a portion of cover plate 11 and dimensioned in such a manner that when the tape dispenser is manipulated so that pressure roller 18, lower portion 12A (Figure 1) of cover plate 12 and leg 31 are rested on the surface 32 to which the tape is being affixed, the width of the tape underneath roller 18 is in a plane parallel to the surface 32 and the rim of roller 18 contacts the tape width and surface 32 over the entire width. In this manner the tape can be applied without wrinkle or loose intermediate portions.

Figure 6 illustrates how the tape dispenser is used to affix tape to a surface 32 by employing a straight edge 33 applied against the cover plate 12 and the vertical position of the dispenser being assured by means of the "three-point support" of the tape dispenser on the surface, specifically by means of pressure roller 18, portion 12A of cover plate 12 and leg 31 extending outwardly from cover plate 11.

It will be apparent that the straight edge 33 might be a "French curve" a T-square, a triangle or a similar drafting guide used for the purpose of laying tape in a predetermined straight line or through plotted points. In all these cases the dispenser is simply drawn along this drafting guide.

The tape dispenser according to the description above has been designed primarily to reduce friction, to be drawn along a drafting guide, and to assure that the tape is being affixed in such a manner that it adheres to the surface over the entire width thus preventing wrinkling and other deformations to the tape, an occurrence which obviously would destroy the appearance and accuracy of a statistical graph. The reduction of friction in the tape dispenser is of paramount importance since pressure adhesive tapes of 1/32 inch width for instance, are extremely flimsy, difficult to handle and will tear and break readily. By designing the dispenser in such a manner that the roll and tape is supported to encounter a minimum of friction yet restricting the lateral play, statistical graphs can be made with maximum accuracy and precision. Experience has shown that the foregoing design permits unskilled people to produce "professional" charts and graphs in a matter of minutes and without any previous experience or prior training.

It will be apparent that the broad principles described in the above specification are not restricted to dispensers for extremely narrow tapes but may be applied equally well to tapes of greater width, for instance 1/4 inch, 1/2 inch or more.

While there has been described a certain embodiment of the instant invention, it will be apparent to those skilled in the art that many variations and modifications may be made therein without departing from the broad field of the invention which should be limited only by the scope of the appended claims.

What is claimed is:

1. A tape dispenser of the type described comprising a pair of flat, spaced, substantially circular cover plates; a roll of pressure sensitive adhesive tape confined between said plates; one of said plates having protruding at its inside a centrally located circular spindle, its circumference adapted to engage the inner diameter of the roll of tape and the protruding thickness of said spindle being substantially equal to the width of the roll of tape to be dispensed; fastening means located at the center of the spindle to hold said plates together and securing the roll of tape therebetween; the inside surface of at least one cover plate being provided with scorings to reduce friction of the roll of tape against the plate and adhesion of the tape to the plate; a plurality of spacing lugs disposed near the periphery of said plates and extending from one plate toward the other plate, each lug protruding a distance substantially equal to the thickness of said spindle thereby spacing said cover plates uniformly from one another; said cover plates having an extended portion; a set of rollers confined between said extended portion and the tape to be dispensed being fed about said rollers; one of said rollers protruding partially from said cover plates and serving as pressure roller for pressing the tape onto the surface to which it is being affixed; an L-shaped supporting leg extending outwardly from one of the plates and adapted to rest when dispensing tape on the surface to which the tape is being affixed thereby causing said dispenser when supported on said pressure roller, said leg and on a portion of said spaced apart cover plates to dispense tape the width thereof being placed in a plane parallel to the plane of said surface, and one of said lugs spaced in close proximity to said pressure roller whereby the tape is retainingly confined in the space between said roller and said lug.

2. A tape dispenser of the type described comprising a pair of flat, spaced, substantially circular cover plates; a roll of pressure sensitive adhesive tape confined between said plates; one of said plates having protruding at its inside a centrally located circular spindle, its circumference adapted to engage the inner diameter of the roll of tape and the protruding thickness of said spindle being substantially equal to the width of the roll of tape to be dispensed; fastening means located at the center of the spindle to hold said plates together and securing the roll of tape therebetween; the inside surface of at least one cover plate being provided with scorings to reduce friction of the roll of tape against the plate and adhesion of the tape to the plate; a plurality of spacing lugs disposed near the periphery of said plates and extending from one plate toward the other plate, each lug protruding a distance substantially equal to the thickness of said spindle thereby spacing said cover plates uniformly from one another; said cover plates having an extended portion; a set of rollers confined between said extended portion and the tape to be dispensed being fed about said rollers; one of said rollers protruding partially from said cover plates and serving as pressure roller for pressing the tape onto the surface to which it is being affixed; an L-shaped supporting leg extruded from one of said plates and extending outwardly therefrom, said leg adapted to rest when dispensing tape on the surface to which the tape is being affixed thereby causing said dispenser when supported on said pressure roller, said leg and on a portion of said spaced apart cover plates to dispense tape the width thereof being placed in a plane parallel to the plane of said surface, and one of said lugs spaced in close proximity to said pressure roller whereby the tape is retainingly confined in the space between said roller and said lug.

3. A tape dispenser of the type described comprising a pair of flat, spaced, substantially circular cover plates; a roll of pressure sensitive adhesive tape confined between said plates; one of said plates having protruding at its inside a centrally located circular spindle, its circumference adapted to engage the inner diameter of the roll of tape and the protruding thickness of said spindle being substantially equal to the width of the roll of tape to be dispensed; screw fastening means located at the center of the spindle to hold said plates together and securing the roll of tape therebetween; the inside surfaces of both cover plates being provided with scorings to reduce friction of the roll of tape against the plates and adhesion of the tape to the plates; a plurality of spacing lugs disposed near the periphery of said plates and extending from one plate toward the other plate, each lug being extruded from one of the plates and protruding a distance substantially equal to the thickness of said spindle thereby spacing said cover plates uniformly from one another; said cover plates having an extended portion; a set of rollers confined between said extended portion and the tape to be dispensed being fed about said rollers; one of said rollers protruding partially from said cover plates and serving as pressure roller for pressing the tape onto the surface to which it is being affixed; an L-shaped supporting leg extruded from one of said plates and extending outwardly therefrom, said leg adapted to rest when dispensing tape on the surface to which the tape is being affixed thereby causing said dispenser when supported on said pressure roller, said leg and on a portion of said spaced apart cover plates to dispense tape the width thereof being placed in a plane parallel to the plane of said surface, and one of said lugs spaced in close proximity to said pressure roller whereby the tape is retainingly confined in the space between said roller and said lug.

References Cited in the file of this patent

UNITED STATES PATENTS

| | | |
|---|---|---|
| 870,388 | Shaw | Nov. 5, 1907 |
| 1,178,358 | Thomas | Apr. 4, 1916 |
| 1,880,633 | Wittel | Oct. 4, 1932 |
| 1,965,753 | Scoles | July 10, 1934 |
| 2,487,351 | Marsh | Nov. 8, 1949 |
| 2,500,157 | Deutsch | Mar. 14, 1950 |
| 2,763,393 | Gill et al. | Sept. 18, 1956 |